（12） United States Patent
Adams

(10) Patent No.: US 9,195,487 B2
(45) Date of Patent: Nov. 24, 2015

(54) INTERPOSITION METHOD SUITABLE FOR HARDWARE-ASSISTED VIRTUAL MACHINE

(75) Inventor: Keith Adams, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 1518 days.

(21) Appl. No.: 12/468,744

(22) Filed: May 19, 2009

(65) Prior Publication Data

US 2010/0299665 A1  Nov. 25, 2010

(51) Int. Cl.
  *G06F 9/455* (2006.01)
  *G06F 9/46* (2006.01)
  *G06F 9/48* (2006.01)

(52) U.S. Cl.
  CPC .......... *G06F 9/45533* (2013.01); *G06F 9/4812* (2013.01); *G06F 9/45558* (2013.01); *G06F 9/4806* (2013.01)

(58) Field of Classification Search
  CPC . G06F 12/08; G06F 12/1009; G06F 12/1425; G06F 2212/151; G06F 11/3466; G06F 9/45533; G06F 9/45558; G06F 9/4806
  See application file for complete search history.

(56) References Cited

U.S. PATENT DOCUMENTS

| | | | | |
|---|---|---|---|---|
| 6,412,035 | B1 * | 6/2002 | Webber | 710/261 |
| 7,299,337 | B2 | 11/2007 | Traut et al. | |
| 2005/0027972 | A1 * | 2/2005 | Harrington et al. | 712/233 |
| 2005/0154812 | A1 * | 7/2005 | DeWitt et al. | 710/260 |
| 2007/0157197 | A1 * | 7/2007 | Neiger et al. | 718/1 |
| 2009/0037936 | A1 * | 2/2009 | Serebrin | 719/318 |
| 2009/0172330 | A1 * | 7/2009 | Dewan et al. | 711/163 |
| 2009/0187904 | A1 * | 7/2009 | Serebrin et al. | 718/1 |

OTHER PUBLICATIONS

Loguidc1 ("e500 memory management unit (MMU) course", freescale.com, Oct. 13, 2005, pp. 1-51.*
Pagel ("Automated virtual machine Interospection for host-based intrusion detection", department of air force and air university, Mar. 2009, pp. 1-105).*
Web archive ("VM techniques", Web.archive.org, Mar. 2008, pp. 1-5).*
Adams, Keith and Agesen, Ole, "A Comparison of Software and Hardware Techniques for x86 Virtualization", ASPLOS, Oct. 21-25, 2006, 12 pages.

(Continued)

*Primary Examiner* — Abdullah Al Kawsar
*Assistant Examiner* — Caroline H Arcos

(57) ABSTRACT

One embodiment of the present invention is a method of interposing operations in a computational system that includes a virtualization system executable on an underlying hardware processor that natively supports one or more instructions that transition between host and guest execution modes. The method includes introducing a hooked vector into a supervisor register block of the hardware processor, wherein the hooked vector displaces a system call handler vector otherwise set by a guest computation; read and write protecting at least the hooked vector containing portion of the supervisor register block; initiating execution of a code sequence of the guest computation on the hardware processor using one of the instructions that transition between the host and guest execution modes thereof, wherein the code sequence includes a system call and wherein upon initiation of the system call, the hardware processor transfers execution to a substitute handler in accordance with the hooked vector; and responsive to execution of the substitute handler, initiating a hooked operation and transferring control to the guest system call handler.

20 Claims, 8 Drawing Sheets

(56) References Cited

OTHER PUBLICATIONS

Gulbrandsen, John, "Why is SYSENTER faster?", Summit Soft Consulting Articles, Jun. 11, 2008, pp. 1-10, .summitsoftconsulting.com/SysCallOpts.htm.

Ferrie, Peter, "Attacks on Virtual Machine Emulators", Symantec Advanced Threat Research, pp. 1-13 , 2007.

Intel Corporation, "Intel Virtualization Technology Hardware-Assisted Virtualization for Today's Business" Technology Brief, 2006, 4 pages.

Neiger, Gil et al., "Intel Virtualization Technology: Hardware Support for Efficient Processor Virtualization", Intel Technology Journal, vol. 10, Issue 3, Aug. 10, 2006, pp. 167-178.

Myers, Michael and Youndt, Stephen, "An Introduction to Hardware-Assisted Virtual Machine (HVM) Rootkits", Aug. 7, 2007, pp. 1-15, crucialsecurity.com/.

Hand, Steven et al., "hardware virtualization with Xen", Login:, Feb. 2007, pp. 21-27.

Intel, "Intel 64 and IA-32 Architectures Software Developer's Manual", vol. 3A: System Programming Guide, Part 1, Feb. 2008, 4 pages.

Intel, "Intel 64 and IA-32 Architectures Software Developer's Manual", vol. 3B: System Programming Guide, Part 2, Feb. 2008, 9 pages.

\* cited by examiner

INTERPOSITION METHOD SUITABLE FOR HARDWARE-ASSISTED VIRTUAL MACHINE

BACKGROUND

Users and/or systems often wish to observe low-level behavior of software. Indeed, such observations can play a role in a wide variety of useful systems and applications including for performance analysis, correctness checks, auditing, security behaviors, enforcement of security policies, etc. In many such systems and applications, a basic technique for observing behaviors is interposition, whereby an observer seeks to interpose on operations of interest performed by or for the observed software.

In systems that employ conventional virtualization technology, a virtual machine monitor (VMM), hypervisor or other software component typically provides a layer of indirection between a guest computation (e.g., a guest operating system) and underlying hardware. Often, such a layer is a useful locus for interposition mechanisms and creates opportunities for interposing on events that might otherwise be difficult to instrument due to their low-level nature. For example, instrumentation of events such as device operations, asynchronous interrupts, system calls, execution of particular instructions in a guest kernel, etc. can be simplified because, in a conventional virtualization system, these events pass through the control of the virtualization layer before being reflected into the guest. Accordingly, the virtual machine monitor (VMM) or hypervisor provides an attractive instrumentation point for systems and applications that wish to observe low-level software behavior.

As virtualization technologies have gained in popularity and market penetration, hardware-assist mechanisms have been developed with the goal of enhancing performance and/or capabilities of virtualization systems and/or simplifying virtualization system implementations. Some of these mechanisms introduce specific hardware features and/or support into processor designs and instruction set architectures. For example, both Intel Corporation and Advanced Micro Devices, Inc. have introduced processor designs with hardware support for processor (CPU) virtualization. Support in Intel processor designs is typically promoted as Intel Virtualization Technology (Intel VT-x™) and was formerly known by the code-name "Vanderpool," while support in AMD designs is typically promoted as AMD Virtualization (AMD-V™) or Secure Virtual Machine (SVM) technology and was at one time known by the code-name "Pacifica." Intel VT-x and AMD-V are trademarks of the respective entities.

Unfortunately, some of these hardware-assist mechanisms tend to limit the opportunities for, and efficacy of, interposition techniques that have previously been employed in a VMM or hypervisor. In particular, some events that may have been comparatively easy to interpose upon when the VMM or hypervisor acted as an intermediary and executed guest code (e.g., directly or in dynamically-translated form) on underlying hardware, may be completely opaque to traditional virtualization-based interposition techniques. For example, system calls, faults, and in some cases, interrupts can all occur without visibility to the VMM or hypervisor in virtualization systems that build upon hardware mechanisms to initiate guest computation sequences and/or manage guest state information.

Accordingly, improved and/or alternative methods are desired.

SUMMARY

Embodiments of the present invention include methods, systems, apparati, computer program products and other tangible realizations of virtualization techniques that selectively interpose on guest system calls using a hooked vector introduced into a supervisor register block of a processor implementation that itself provides support for virtualization using virtualization-related instruction set and/or architectural extensions. One embodiment of the present invention is a method of interposing operations in a computational system that includes a virtualization system executable on an underlying hardware processor that natively supports one or more instructions that transition between host and guest execution modes. The method includes introducing a hooked vector into a supervisor register block of the hardware processor, wherein the hooked vector displaces a system call handler vector otherwise set by a guest computation for activating a system call handler; read and write protecting at least the hooked vector containing portion of the supervisor register block; initiating execution of a code sequence of the guest computation on the hardware processor using one of the instructions that transition between the host and guest execution modes thereof, wherein the code sequence includes a system call and wherein upon initiation of the system call, the hardware processor transfers execution to a substitute handler in accordance with the hooked vector; and responsive to execution of the substitute handler, initiating a hooked operation and transferring control to the system call handler.

BRIEF DESCRIPTION OF THE DRAWINGS

The use of the same reference symbols in different drawings indicates similar or identical items.

DESCRIPTION

Figure 1:
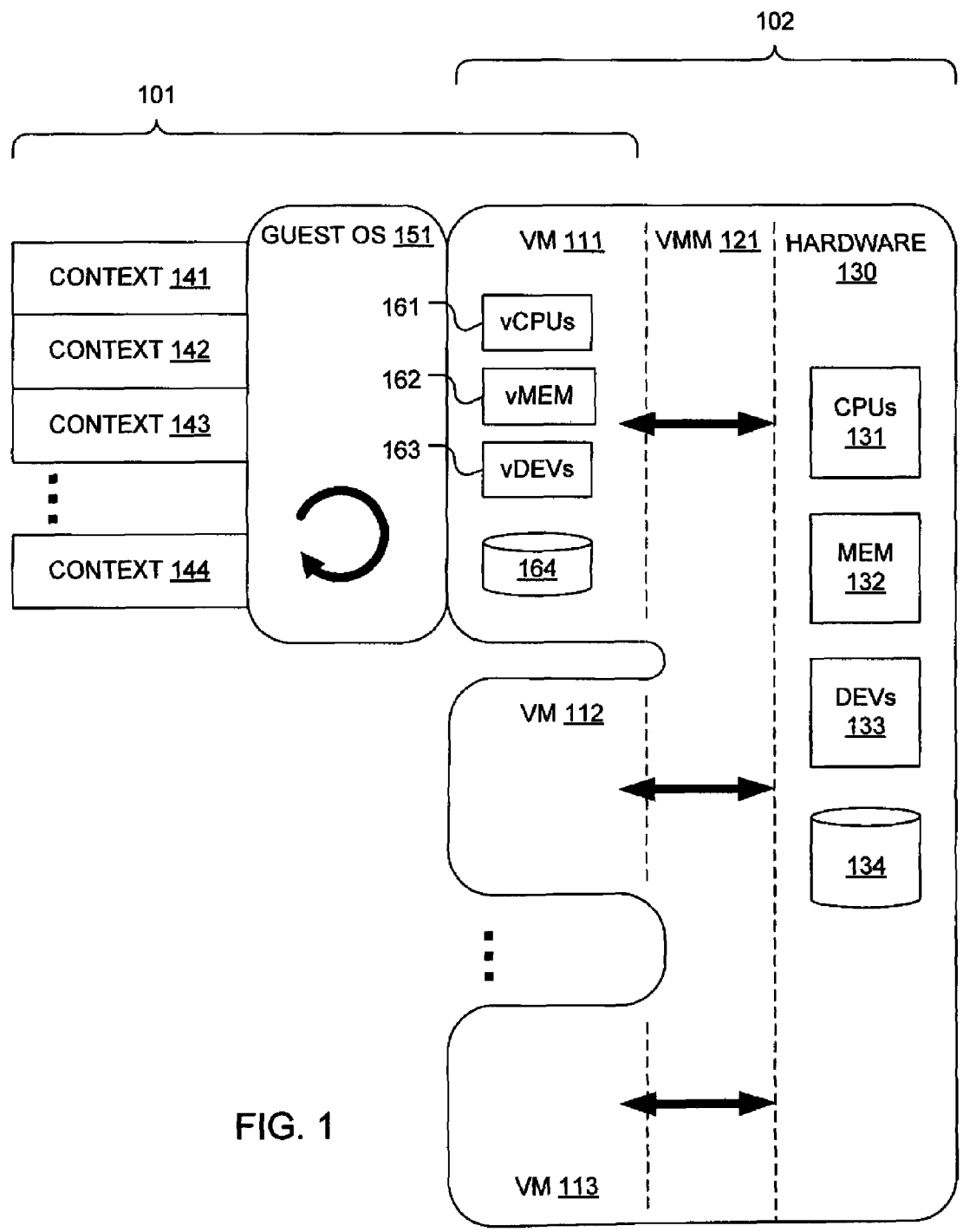
FIG. 1 depicts a virtualization system and an underlying physical machine in which one or more embodiments of the present invention may be used.

Various computational systems, including virtualization systems and operating systems that provide virtualization or isolation support, can benefit from designs and techniques that hook certain events types and, in particular, syscall-type events, using software constructs and/or mechanisms that are selectively introduced into a guest computation. In this way, the introduced constructs/mechanisms may constitute a part of the computation directly executed at a reduced-privilege (e.g., guest) execution mode on underlying hardware using hardware-assistance for classical trap-and-emulate virtualization. While software constructs and mechanisms described herein may, in some cases, be employed in connection with the binary translation facilities that have been employed in virtual machine monitors (VMMs) for processor architectures such as x86-type architectures, these software constructs and mechanisms facilitate hooking of certain events and, in particular, syscall-type events, even when event occurrences are in code directly executed on underlying hardware without use of facilities ordinarily associated with VMM-mediated binary translation.

Accordingly, these software constructs and mechanisms are well-suited to virtualization system and operating system implementations that seek to exploit hardware-assisted virtualization features now appearing in certain Intel and AMD microprocessor designs. Examples of these hardware-assisted virtualization features and technologies include Intel Virtualization Technology (Intel VT-x™) or "Vanderpool" technology and AMD Virtualization (AMD-V™), Secure Virtual Machine (AMD SVM) or "Pacifica" technologies. Typically, these hardware-assisted virtualization technologies seek to simplify VMM implementation by allowing a virtualization system or operating system to present guest code for direct, reduced-privilege guest execution on underlying hardware but establish a bounding set of conditions which will cause execution to revert to the VMM.

Although specific implementations may differ, hardware-assisted virtualization technologies can typically be understood as providing some sort of in-memory data structure, often referred to as a virtual machine control block (VMCB) or virtual machine control store, that combines control state with a subset of the state of a guest virtual machine together with an additional, reduced-privilege execution mode, or guest mode, that supports direct execution of guest code, including privileged code, while reserving an architected execution mode for VMM and/or host operating system code. In general, this description refers to such an architected execution environment as host mode, irrespective of naming conventions employed in a particular hardware-assistance design and whether or not a host operating system is employed. A new instruction, canonically vmrun, transitions from host to guest mode. Upon execution of vmrun, the hardware loads guest state from the VMCB and continues with direct execution of guest code in the guest mode. Guest code execution proceeds until some condition, typically expressed by the VMM using control records/bits of the VMCB, is reached. At this point, the hardware performs an exit operation (canonically #vmexit), which is essentially the inverse of a vmrun operation. On #vmexit, the hardware saves guest state to the VMCB, loads VMM-supplied state into the hardware, and resumes in host mode, now executing the VMM.

Thus, in systems that employ hardware-assisted virtualization technologies, the VMM may have largely ceded control of the processor to the guest computation at the point when a to-be-interposed-upon event occurs. Some event types, e.g., guest faults, present reasonably straightforward interposition challenges and may be hooked using facilities of hardware-assisted virtualization technologies, e.g., exiting fault bit masks. However, other event types, particularly syscall-call type events, present greater challenges, particularly if it is desirable to limit interposition overheads. Accordingly, the description herein details techniques whereby a VMM may cause selected events to be "hooked" in the guest in a way that imposes generally low interposition overhead and in a way that remains hidden from the guest computation.

It has been discovered that virtualization systems (including operating system implementations that provide virtualization or isolation support), which seek to provide efficient interposition facilities for guest events can, in at least some situations, profitably employ techniques that selectively interpose on guest system calls using a hooked vector introduced into a supervisor register block of a processor implementation that itself provides hardware support for virtualization. In some embodiments, tools and/or interfaces are provided that rewrite one or more system call vectors encoded in model-specific registers (MSRs) or in other appropriate supervisor register blocks to point instead to substitute handlers that conditionally hypercall the virtualization system (e.g., the VMM or hypervisor) to notify that a system call has taken place. In some embodiments, the substitute handler then inseparably (i.e., in a way that is not interruptible or discernible by the guest computation) vectors to the guest system call handler. By injecting substitute handler "wrappers" and initialization code as a loadable kernel module (or modules) functionality is introduced into the guest computation itself. In some embodiments, the introduced hooked vector(s) and related functionality can be hidden from the guest by read protecting appropriate portions of the supervisor register block(s) and replaying guest values using a handled protection fault. Write protection is also provided in some embodiments.

In this way, syscall-type events can be hooked in the guest, rather than in the VMM. Accordingly, in one or more embodiments in accordance with the present invention, methods, systems, apparati, computer program products and/or other tangible realizations of techniques are employed to allow a virtualization system (including, in some cases, an operating system that provides virtualization support) to interpose on guest operations even in situations where the virtualization system runs or is configured to run on underlying hardware that provide hardware-assistance direct execution of guest code. In general, these techniques tend to avoid taxing all syscall-type events with overheads (and latencies) associated with exception and/or fault handling. Rather, some embodiments in accordance with the present invention introduce a comparatively efficient hypercall into kernel code executed by the guest computation.

In general, embodiments of the present invention are selectively introduced into the guest using facilities of a virtualization layer (e.g., from a virtual machine monitor or hypervisor) and do not require cooperation or support from a guest operating system running within a virtual machine. This independence can be useful when, as is often the case, the virtualization system helps to isolate multiple operating system instances and related computations from each other. That said, modern operating systems vendors face increasing pressure to include virtualization features or capabilities in their product offerings, and as a result, product offerings styled as operating systems may increasingly incorporate virtualization system concepts. Accordingly, it is important to recognize that a virtualization barrier or boundary, i.e., a barrier or boundary between (i) software that manages, exports and/or aggregates underlying hardware resources for presentation as a virtual machine and (ii) software that operates within such a virtual machine, can exist at the interface between separately supplied software components or within software marketed, aggregated and/or supplied as a single product. Indeed, embodiments that provide virtualization support in a software product marketed, aggregated and/or supplied as an "operating system" are envisioned and may fall within the scope of certain of the appended claims. This application uses the term "export" in connection with presenting virtualized hardware for use by guest software running in a virtual machine. The use of this term is not intended to limit the methods by which underlying hardware is presented to guest software as virtualized hardware. For example, "exporting" the underlying hardware resources of a physical computer system to a virtual machine may involve presenting virtual resources that are substantially different from the underlying hardware resources. As just one example of many, a LUN (Logical Unit Number) of a physical SAN (Storage Area Network) that is accessed through a HBA (Host Bus Adapter) may be "exported" to a virtual machine as a local SCSI (Small Computer System Interface) hard drive or as a USB (Universal Serial Bus) flash drive, so that the LUN appears to guest software to be a local SCSI drive or a USB flash drive.

For concreteness, embodiments based on facilities and terminology typical of certain illustrative processor architectures, operating systems and virtualization systems are described. In particular, hardware-assistance for virtualization typical of certain illustrative Intel and AMD processor architectures provides a useful illustrative context. Similarly, system call mechanisms and constructs typical of x86 (and IA-32) instruction set processor architectures from Intel Corporation and Microsoft® Windows operating systems provide a useful descriptive context for the described embodiments. That said, embodiments of the present invention are general to a wide variety of processor architectures (including those of dissimilar design and those that implement other system call mechanisms), to numerous operating system implementations as well as to computations that need not include, or be coordinated by, a conventional operating system.

Accordingly, in view of the foregoing and without limitation on the range of underlying processor, memory or system designs; operating systems; or virtualization techniques that may be employed in embodiments of the present invention, based on these embodiments, and on the claims that follow, persons of ordinary skill in the art will appreciate a broad range of suitable implementations and embodiments.

Virtualization Systems, Generally

FIG. 1 depicts a virtualization system in which techniques in accordance with one or more embodiments of the present invention may be employed. In particular, FIG. 1 is meant to illustrate a class of virtualization system embodiments in which underlying hardware resources 130 are exported to guest computations as one or more isolated, and apparently independent, virtual machines (e.g., VM 111, VM 112 . . . VM 113). In the illustrated system, guest system 151 (e.g., an instance of a conventional Microsoft® Windows or Linux® operating system) executes in coordination with VM 111, providing application software and operating system services with virtual computer 101 on (or in) which to execute. As is typical of modern operating system design, applications (and some services) usually run in their own memory address spaces and can include one or more execution contexts (e.g., contexts 141, 142, 143 . . . 144) each having an associated instruction pointer and other state. Typically, an execution context, which may be referred to as a "process," "thread" or "task" depending on conventions of the particular operating system or execution environment, includes at least state of processor registers (and perhaps uncommitted memory state) together with a virtual address space (consistent with page table mappings).

As on a conventional hardware computer platform, guest operating system 151 coordinates execution sequences of instructions on one or more processors (or CPUs), helps to maintain memory management and/or mapping information (e.g., virtual-to-physical page mappings) and manages devices of an underlying computational machine. Together, the operating system and underlying computational machine (e.g., guest operating system 151 and VM 111 of virtual computer 101 in the illustrated configuration) manage context switches amongst various execution contexts based on priority, data or instruction memory access stalls, input/output events, explicit code directives, etc. Numerous techniques and designs (both hardware and software) for scheduling and performing context switches in multitasking/multithreaded systems are known and will be understood by persons of ordinary skill in the art. However, in each case, the identity of at least a current execution context is part of the observable state of the computational machine (or in the illustration of FIG. 1, of VM 111).

From the perspective of operating system 151 and the individual execution contexts thereof, exported VM 111 appears to be and, indeed, behaves like a conventional hardware computer platform, executing instruction sequences and presenting an apparent processor and memory state. Indeed, in some embodiments of virtualization system 102, the interface presented by VM 111 (including the apparent operation of virtual-to-physical memory mappings) may be nearly indistinguishable from a conventional hardware computer platform. However, unlike a conventional hardware computer platform, virtualization system 102 itself manages underlying hardware resources (e.g., without limitation, CPUs 131, memory 132, devices 133 and storage 134) and exports virtual resources (e.g., virtual processor(s) 161, vMEM 162, virtual devices 163 and virtual storage 164) rather than the underlying resources themselves to guest computations such as guest operating system 151 and any applications/services executing therewith. Typically, VM 111 presents a virtual-to-apparent-physical page mapping state in the form of memory-resident page directory and page table data structures, virtual TLB states, etc., but hides further mappings to actual physical pages in memory 132 used by virtualization system 102 to support a guest computation.

In general, the characteristics and configurations of an exported virtual machine need not match those of underlying hardware resources, although in many implementations and in particular in those implementations that exploit underlying hardware-assistance for direct execution of guest code, a correspondence between instruction set architectures of exported virtual processors and underlying hardware CPUs is typical. Nonetheless, while particular virtualization strategies/designs are described herein, virtualization system 102 is representative of a wide variety of designs and implementations in which underlying hardware resources are presented to software (typically to operating system software and/or applications) as virtualized instances of computational systems that may or may not precisely mirror the underlying physical hardware.

Virtualization systems are well known in the art and include commercial implementations, such as VMware ESX™, VMware® ESX Server, VMware® Server and VMware® Workstation, available from VMware, Inc., Palo Alto, Calif.; Microsoft® Virtual Server 2005; operating systems with virtualization support, such as Linux KVM or user-mode Linux (UML); and open-source implementations such as those available from XenSource, Inc. Accordingly, persons of ordinary skill in the art will appreciate the described embodiments for selectively interposing on guest system calls in the context of a substantial existing body of virtual machine technology.

Typically, virtual resources of an exported virtual machine are presented to a guest computation using mapping and/or emulation techniques. When underlying hardware provides hardware assistance for virtualization, direct execution of at least some guest code can typically be managed using facilities provided by the underlying hardware. Nonetheless, at least some supervisory interface is provided between the guest software and the various hardware components and devices in the underlying hardware platform. This interface may include one or more software components and/or layers, possibly including one or more software components known in the field of virtual machine technology as "virtual machine monitors" (VMMs), "hypervisors," or virtualization "kernels." For purposes of illustration only, and without limitation, VMM layer 121 is illustrated in which operative mappings and/or emulations will typically be performed and in which virtual machine control blocks are managed and direct execution of guest code is initiated using hardware-assistance constructs of an underlying processor. In the description that follows, certain enhancements or alterations are described, which may be made to the operation of VMM 121 to facilitate interposition techniques that build on selective introduction of hooked vectors into supervisor register blocks. These and other embodiments will be understood with reference to the description that follows.

Figure 2:
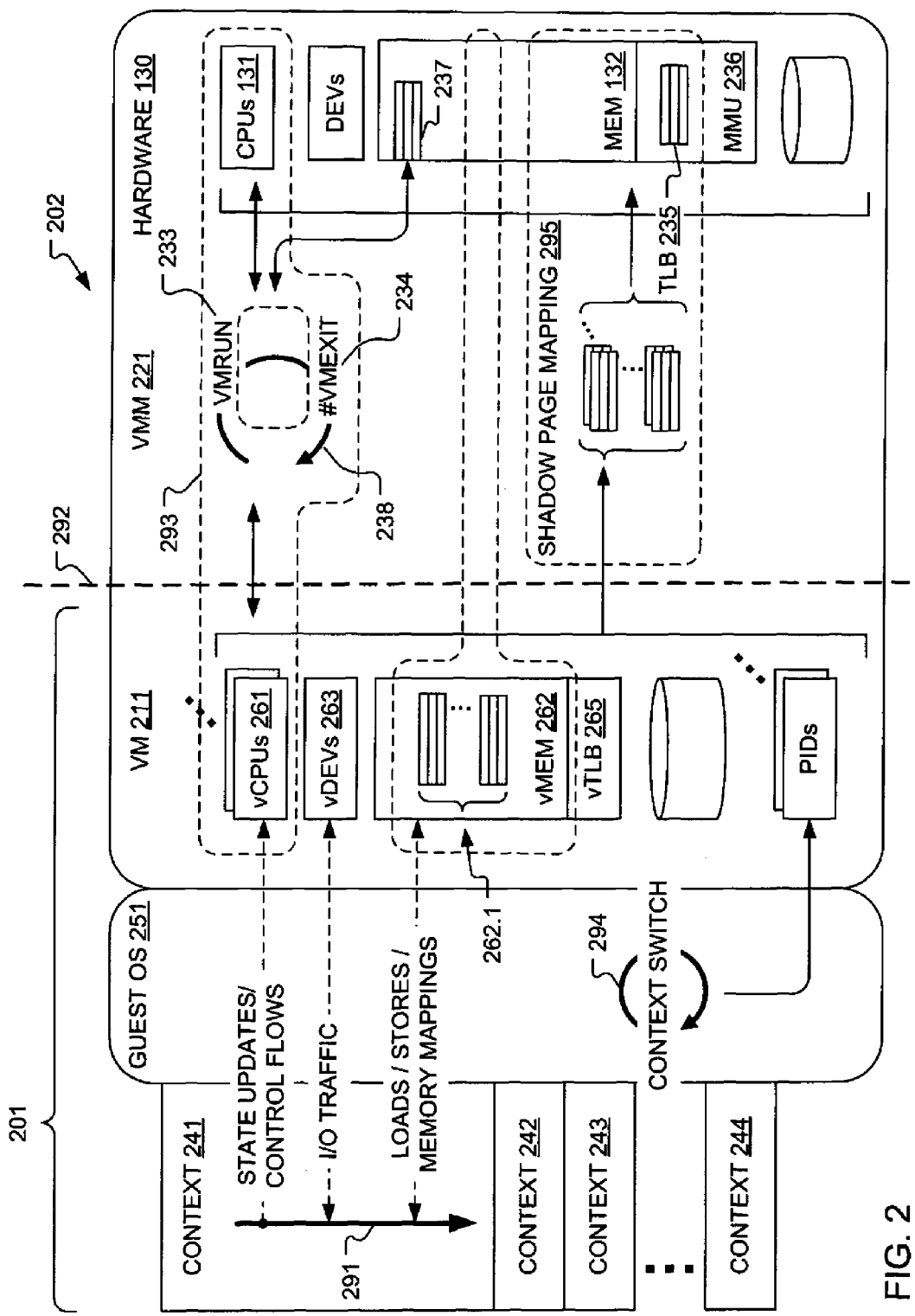
FIG. 2 is a functional block diagram illustrating components of a virtualization system that supports guest computations and in which interposition methods suitable for use in a hardware-assisted virtual machine may be employed in accordance with some embodiments of the present invention.

FIG. 2 presents a functional block diagram illustrating components of a virtualization system 202 that supports guest computations and in which interposition techniques in accordance with some embodiments of the present invention are employed. In an illustrative use case, an operating system instance, e.g., guest OS 251, coordinates execution of various execution contexts (corresponding generally to processes, threads and/or tasks) on an exported virtual machine, e.g., on VM 211. Thus, virtual computer 201 operates (at least from the perspective of guest OS 251 and execution contexts 241, 241, 243 . . . 244) in a manner largely analogous to a conventional hardware computer. Each virtual CPU (vCPU) typically has its own "active" context and, at any given time, an execution context (e.g., current context 241) will be current and state of at least one vCPU 261 corresponds thereto. In particular, register states, instruction pointer state, memory address translation data structures etc. exported as VM 211 are those appropriate to the current state of current context 241. Therefore, instruction sequences (including sequences of user code and system calls appropriate to current context 241) are executed on VM 211 and ordinarily result in progress of a computation associated with current context 241. In particular, individual instructions of instruction sequence 291 are executed and ordinarily result in updates to register state of exported vCPU 261.

Control flow instructions affect call/return stacks and load & store instructions affect buffer and exported memory (vMEM 262) states as well as memory address translation data structures (including page mappings, GVPN→GPPN, coded in guest page tables 262.1 and/or vTLB 265). As is conventional in some virtualization system designs, VMM 221 manages additional mappings that complete address mappings from a guest address space apparent to guest OS 251 and its execution contexts to machine physical pages (PPNs) in underlying physical memory 132. Like other memory states exported as part of vMEM 262, guest page tables 262.1 actually reside in underlying physical memory at machine physical pages (PPNs) mapped by VMM 221; however, to guest OS 251 and its execution contexts, the guest page tables 262.1 appear to reside in guest physical address space (i.e., at GPPNs) per guest page mappings (those coded in guest page tables 262.1 and/or vTLB 265) that purport to define (at least from the perspective of guest computations) virtual-to-physical address translations. Input/output operations affect the state of exported vDEVs 263 and typically transfer data through buffers in memory exported as vMEM 262.

As is typical in the art, switches between execution contexts are managed or initiated by guest OS 251 based on desired multitasking and scheduling behavior and based on events such as execution and/or memory access stalls and interrupts or faults supplied by VM 211. A switch 294 between execution contexts typically results in some observable change in architectural state of the processor (whether implemented as a hardware processor or, as in FIG. 2, as vCPU 261). For example, in a processor conforming to the Intel® IA-32 microprocessor architecture, states of certain registers, e.g., Control Register 3 (CR3, also known as the Page Table Base Register, PTBR) and the Local Descriptor Table Register (LDTR) which contains the address in memory of the Local Descriptor Table (LDT), can be expected to change in correspondence with a context switch. As a result, contents of the CR3 register are often used in IA-32 architectures as a process id tracking mechanism. Of course, other instruction set architectures and implementations may provide other facilities for tracking context switches, and based on the description herein, persons of ordinary skill in the art will appreciate suitable adaptations. For example, some architectures use an explicit address space identifier (sometimes called an ASID) which may be employed in a manner similar to that described above with respect to the CR3 register of IA-32 architectures. Similarly, a guest operating system may use its own identifier for a context, e.g., a process identifier (PID). Accordingly, in some embodiments in accordance with the present invention, a virtualization system may read such an identifier directly from guest kernel memory.

In illustrated virtualization system 202, VMM 221 exports resources of hardware machine 130 as virtual machine VM 211. For simplicity of illustration, only a single virtual machine is illustrated. In general, VMM 221 manages utilization of underlying hardware structures and states, typically through a combination of direct execution, mapping and/or emulation techniques, and/or selective binary translation of guest code supported by code execution facilities 293. However, for purposes of the present description, interposition challenges of direct hardware-assistance mediated direct execution are emphasized. Accordingly, FIG. 2 illustrates guest code (e.g., instruction sequence 291) scheduled for execution on an exported virtual machine (e.g., vCPU 261) and which is directly executed on an underlying hardware processor (e.g., CPUs 131) using classical trap and emulate virtualization facilitated in some implementations of the ubiquitous x86-type processor architecture using hardware-assistance constructs 238 that are more completely described elsewhere herein. In general, these hardware-assisted constructs include extensions to 32-bit and 64-bit x86 architecture commonly known as VT (Intel® Virtualization Technology) and AMD-V™ (AMD Virtualization), which provide hardware support for trap and emulate methods whereby a VMM may specify those events that will cause the hardware to exit guest execution and trap into the VMM. More generally, a collection of virtualization techniques, including hardware-assisted direct execution, may be employed in a given implementation.

Memory management mechanisms employed by VMM 221 to handle segmentation and memory management export a VM-specific set of segment registers, TLB entries (e.g., vTLB 265) and page table hierarchies (e.g., guest page tables 262.1) to guest computations, while maintaining a generally coherent set of shadow page mappings 295 (GVPN→PPN) for use by MMU 236 in actually mapping memory addresses used in the course of code executed (by code execution facilities 293) in furtherance of the guest computations. As with code execution facilities 293 described above, shadow page mappings 295 are used to faithfully present a model consistent with the machine virtualized.

Typically, internals of any direct execution, emulation and/or binary translation mechanism as well as internals of any segmentation/memory management mechanisms of the virtualization system are hidden from guest computations. Accordingly, a virtualization barrier 292 is illustrated in FIG. 2 to mark a somewhat arbitrary boundary between exported (and therefore visible) states, functionality and constructs of VM 211 and those states, functionality and constructs of VMM 221 (and underlying hardware 130) that are hidden from guest computations.

Hardware Assisted Virtualization, Generally

The description that follows summarizes salient features of certain illustrative hardware-assistance techniques recently introduced in processor designs from Intel and AMD in an effort to simplify and ultimately improve operation and/or performance of virtualization system implementations. In general, these techniques extend x86-type architectures in ways that tend to facilitate classical trap and emulate virtualization. Persons of ordinary skill in the art will recognize that virtualization of x86-type architectures have traditionally presented significant technical challenges and these hardware-assistance techniques in many ways seek to simplify these challenges.

As explained above, these simplifications come at the cost of some reduced opportunities for interposing on events in a virtualization layer. Not to be deterred, this disclosure presents new interposition techniques in accord with some embodiments of the present invention and these techniques will be understood based on the descriptive context provided by the architectural extensions. In this regard, persons of ordinary skill in the art will be generally familiar with both AMD and Intel designs for hardware-assistance, which are detailed in published design documents such as Advanced Micro Devices, Inc., *AMD64 Virtualization Codenamed "Pacifica" Technology: Secure Virtual Machine Architecture Reference Manual* (2005) and Intel Corporation, *Intel® Virtualization Technology Specification for the IA-32 Intel® Architecture* (2005). Despite some apparent differences in terminology, persons of ordinary skill in the art will appreciate the substantial similarity of AMD and Intel hardware-assistance techniques.

Therefore, in an effort to avoid obfuscatory details or idiosyncrasies of one design versus the other, this description tends to view hardware-assistance techniques in a way that emphasizes the commonality of hardware-assistance techniques implemented in AMD and Intel microprocessors. Accordingly, persons of ordinary skill in the art will appreciate techniques of the present invention in view of the generally agnostic, though x86-inspired, presentation of hardware-assistance for virtualization that follows. Any choice of descriptive terminology typical of one design or the other is purely for descriptive convenience and no limiting effect is intended.

In general, processor designs that provide hardware-assistance for virtualization tend to support a number of new primitives to support a classical trap and emulate virtualization. Although specific implementations may vary, hardware-assisted virtualization technologies can typically be understood as providing some sort of in-memory data structure, often referred to as a virtual machine control block (VMCB) or virtual machine control store, that combines control state with a subset of the state of a guest virtual machine. While designs that define a virtual machine control store (VMCS) are similar, for clarity we illustrate the invented techniques using elements typical of a VMCB. In addition to the VMCB, hardware-assisted virtualization technologies typically provide reduced-privilege execution mode, or guest mode, that supports direct execution of guest code, including privileged code, while reserving an architected execution mode for VMM and/or host operating system code.

In general, this description refers to such an architected execution environment as host mode, irrespective of naming conventions employed in a particular hardware-assistance design and whether or not a host operating system is employed. A new instruction, canonically vmrun, causes a transition from host to guest mode. Upon execution of vmrun, the hardware loads guest state from the VMCB and continues with direct execution of guest code in the guest mode. Guest code execution proceeds until some condition, typically expressed by the VMM using control records/bits of the VMCB, is reached. At this point, the hardware performs an exit operation (canonically #vmexit), which is essentially the inverse of a vmrun operation. On #vmexit, the hardware saves guest state to the VMCB, loads VMM-supplied state into the hardware, and resumes in host mode, now executing the VMM. Diagnostic fields are typically provided in the VMCB to aid the VMM in handling the exit. For example, exits due to guest I/O provide the port, width, and direction of I/O operation. After emulating the effect of the exiting operation in the VMCB, the VMM again executes vmrun, returning to guest mode.

By way of illustration, FIG. 2 shows a configuration in which VMM 221 employs an illustrative hardware-assisted direct execution construct 238 whereby direct execution of guest code is initiated on underlying hardware processor 131 using a vmrun instruction 233 and, at some later point, control is returned to VMM 221 (see #vmexit 234) based on conditions established for the direct execution using records/bits of VMCB 237. VMCB 237 control bits provide some flexibility in the level of trust placed in the guest. For instance, a VMM behaving as a hypervisor for a general-purpose OS might allow that OS to drive system peripherals, handle interrupts, or build page tables. However, when applying hardware assistance to pure virtualization, the guest must run on a shorter leash.

In general, VMM 221 programs VMCB 237 in a way that directs hardware 130 to trigger #vmexit 234 in situations appropriate for the virtualization system implementation. For example, in some implementations, VMCB 237 can be programmed to trigger #vmexit 234 on guest page faults, TLB flushes, and address-space switches in order to maintain the shadow page tables; on I/O instructions to run emulated models of guest peripherals; on accesses to privileged data structures such as page tables and memory-mapped devices, etc. When running a protected mode guest, VMM 221 fills in VMCB 237 with the current guest state and executes vmrun instruction 233. On guest exits (#vmexit 234), VMM 221 reads fields of VMCB 237 describing the conditions for the exit, and vectors to appropriate emulation code. The emulation code is typically provided by software that implements VMM 221 and includes peripheral device models, code for delivery of guest interrupts, and many infrastructure tasks such as logging, synchronization and interaction with a host operating system, if any.

Interposition Techniques

Figure 3:
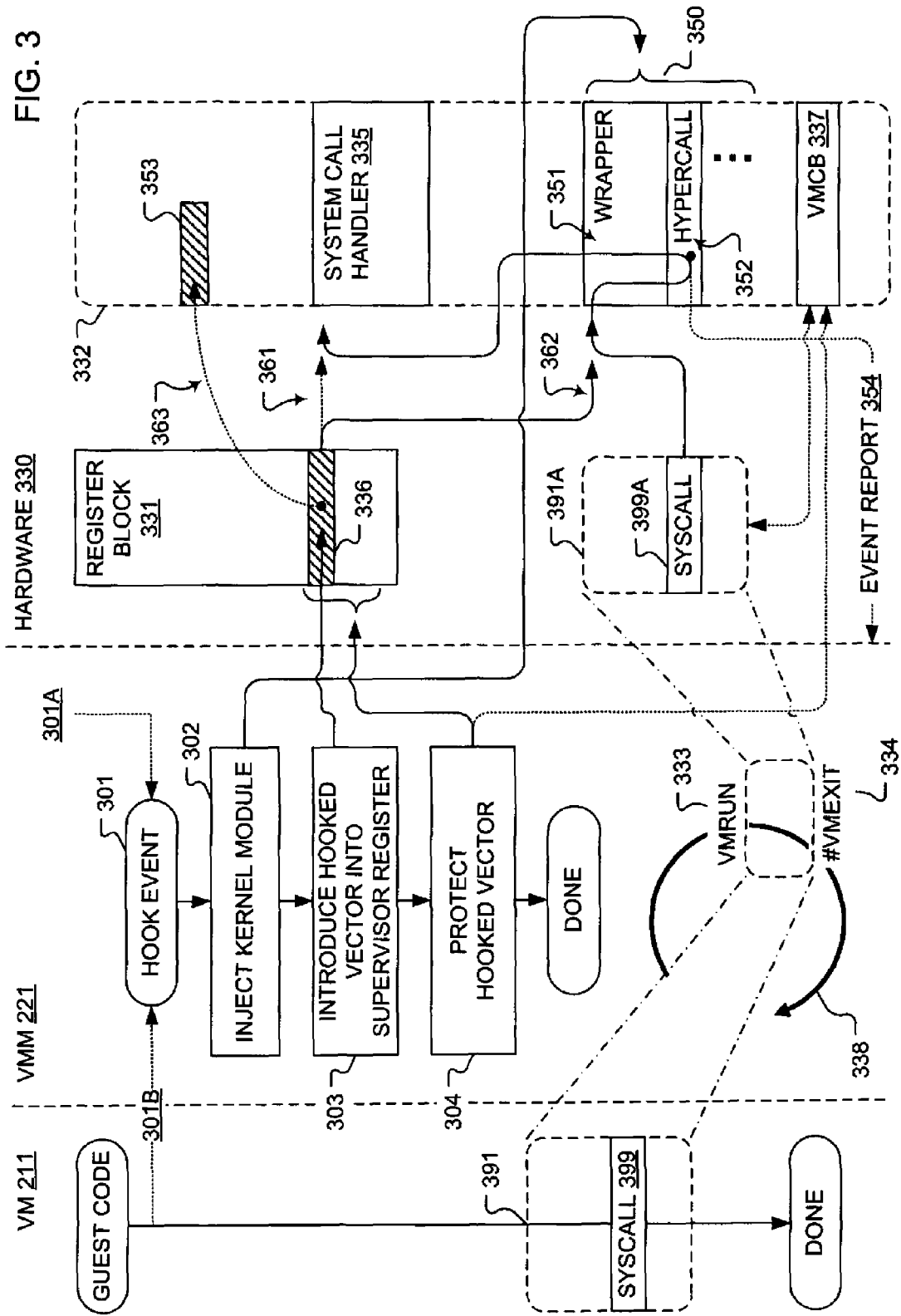
FIG. 3 illustrates operation of a virtualization system that introduces a hooked vector into a supervisor register block in accord with some embodiments of the present invention.

FIG. 3 illustrates operation of a virtualization system that introduces a hooked vector into a supervisor register block as part of a virtualization-based mechanism for interposing on system calls in accordance with some embodiments of the present invention. Building on the preceding description of a virtualization system that supports guest computations using direct execution related hardware-assistance features of an underlying hardware processor/system, FIG. 3 illustrates (in somewhat greater detail) the presentation of syscall-containing guest code portion 391 for vmrun-mediated direct execution (as guest code 391A) on underlying hardware 330 together with a VMM-mediated flow (at 301) for selectively hooking the system call (e.g., syscall 399A) contained therein.

As before, VMM 221 employs an illustrative hardware-assisted direct execution construct 338 whereby direct execution of guest code is initiated on underlying hardware system 330 using a vmrun instruction 333 and, at some later point, control is returned to VMM 221 (see #vmexit 334) based on a set of conditions established for operation of the hardware system when directly executing guest code in, or on behalf of, exported virtual machine 211. As before, building on the hardware-assisted execution model typical of some modern x86 type processor designs, at least some of those conditions are represented (typically in connection with other VM-specific state) in an in-memory data structure (e.g., VMCB 337) that partially defines the execution environment that hardware system 330 presents to guest code 391A. VMCB 337 can also serve as a backing store for such conditions and for VM-specific state when code implementing VMM 221 executes on hardware system 330 or when code for some other exported virtual machine executes thereon.

As is conventional, a supervisor register block 331 (e.g., a machine specific register, MSR) or some other architected, hardware-resident store is implemented by hardware system 330. Included (at runtime) in supervisor register block 331 are one or more system call vectors that serve to identify locations in memory 332 where system call handler code resides. Persons of ordinary skill in the art will recognize that any of a variety of system call instructions and corresponding vectors may be supported in a particular embodiment of hardware system 330. For example, in some x86-type processor architectures, a sysenter instruction causes the processor to execute code at the instruction address identified by the SYSENTER_EIP_MSR entry of an MSR store. Similarly, in some x86-type processor designs, a syscall instruction causes the processor to execute (in the case of 64-bit code) instructions identified by the instruction pointer LSTAR entry of an MSR store or (in the case of 32-bit compatibility mode code) instructions identified by the instruction pointer CSTAR entry. These and other comparable system call instructions and corresponding supervisor register block entries will be appreciated by persons of ordinary skill in the art. However, for the sake of concreteness but without loss of generality, the description that follows conforms to syscall-type conventions.

Conventionally, one or more system call vectors 336 are encoded in supervisor register block 331 and serve to identify an entry point (361) into kernel code that implements system call handler 335. As a result, when hardware system 330 executes syscall 399A, processor logic thereof ordinarily consults system call vectors 336 and follows the instruction pointer coded therein to an entry point 361 for system call handler 335. Handlers are well known in the art and system call handler 335 is of any suitable implementation.

Referring to FIG. 3 and in accordance with some embodiments of the present invention, facilities (e.g., interfaces, code sequences, data structures, etc.) are provided in VMM 221 to initiate a "hook event" operation 301 by injecting (302) alternative handlers 350 into the guest computation as one or more kernel modules and by introducing (303) an alternative "hooked vector" (or vectors) into supervisor register block 331 thereby displacing appropriate ones of the operative system call vectors (e.g., SYSENTER_EIP_MSR, LSTAR, CSTAR, etc., shown illustratively as system call vector 336). The introduced vector(s) instead identify the alternative handler(s) 350 now injected as loadable kernel modules. In some embodiments, alternative handler 350 is injected into the guest computation using conventional facilities for loading kernel modules and includes wrapper code together with a hypercall 352 that resumes execution with the original system call handler 335. In the illustrated configuration, wrapper code 351 executes pre-event instrumentation (within the execution context of the guest) and hypercall 352 conveys an event report 354 to VMM 221. Also in the illustrated configuration, hypercall 352 causes guest execution to resume with system call handler 335 code that would have ordinarily executed absent the interposed operation(s) of alternative handler 350.

Although persons of ordinary skill in the art will appreciate a wide variety of implementations for wrapper code 351, the following pseudocode is illustrative. First, a function in the C programming language may be used to initialize an alternative handler that has been injected into a guest computation, as follows:

```
void
module_init(void)
{
    /* C code initializing alternative handler */
    hypercall(START_SYSCALL_ENTRY_TRACING,
              wrapped_system_call_entry_lowlevel);
    ...
}
```

Next, assembly code may be used as follows:

```
wrapped_system_call_entry_lowlevel:
        mov %rax, syscallregs.rax
        mov %rbx, syscallregs.rbx
        # omitted: save rest of registers
        # Call alternative handler. wrapped_system_call
        # does whatever it wants with the syscall, such as
        # instrumenting a subset of system call events
        # relative to one or more of performance monitoring,
        # execution correctness or auditing, a security behavior,
        # and policy enforcement
        lea syscallregs, %rdi      # argument 0
        call wrapped_system_call_entry
        # hypercall to vector to original system call handler
        lea syscallregs, %rsi       # argument 1
        mov $SYSCALL_ENTER, %rdi   # argument 0
        call hypercall
        # not reached
        ud2
``` where a hypercall is a method, described in the virtualization literature, for transferring control from an execution context of the guest computation to the virtualization system. A hypercall is analogous to a system call, with a transition to virtualization software instead of to a kernel.

In some embodiments, wrapper code may include post event instrumentation (not shown in FIG. 3). In some embodiments, wrapper code injected into the kernel may more immediately initiate the hypercall and pre-event instrumentation may be executed within VMM 221. In some embodiments, post-event instrumentation may also be employed. Pseudocode for such post-event instrumentation could be substantially the same as the pseudocode provided above, except that "entry" and "enter" would be replaced with "exit." Methods used for post-event interposition depend on which system call mechanism is used. As an example, consider a post-event interposition based on SYSRET. SYSRET reads the destination code segment register out of the CSTAR or LSTAR MSRs. If the VMM, in response to a hypercall (START_SYSCALL_EXIT_TRACING, . . . ) call, puts a value which will generate a General Protection (GP) fault into these MSRs and configures the VMCB to cause a #vmexit on a GP fault, the VMM will get control on guest executions of SYSRET. The altered contents of the CSTAR or LSTAR MSRs may be hidden from the guest computation by means that are similar to those described below relative to a hooked vector in a supervisor register block. Based on the description herein, persons of ordinary skill in the art will appreciate suitable modifications to the above-listed pseudocode or other similar implementation.

In general, it can be desirable to hide the use of hooked vectors and indeed the wrapper code itself from the guest computation. Accordingly, in the illustrated flow of FIG. 3, a protection mechanism is enabled (304) or established to cover at least a system call vector 336—containing portion of supervisor register block 331. Based on such protection, attempts by the guest computation to access system call vector 336 may be handled by VMM 221. In general, read and/or write protections may be established using any suitable mechanism, e.g., mechanisms provided by underlying hardware and/or using hardware-assistance features for virtualization. For example, in some implementations of VMCB 337 and in accord with the hardware-assisted execution model typical of some modern x86 type processor designs, one or more MSR protection states may be defined in VMCB 337 whereby the managed execution framework exported to guest code 391 by hardware-assisted direct execution construct 338 treats an attempt (e.g., by guest code 391A) to access system call vector 336 as an event that triggers #VMEXIT 334. Upon #VMEXIT 334, VMM 221 identifies the exit condition and may handle the attempted access in a way that (on read access) spoofs system call vector 336 contents and/or (on write access) updates identifiers for system call handler 335 (in appropriate backing locations) while maintaining the hooked vector in supervisor register block 331.

Figure 5:
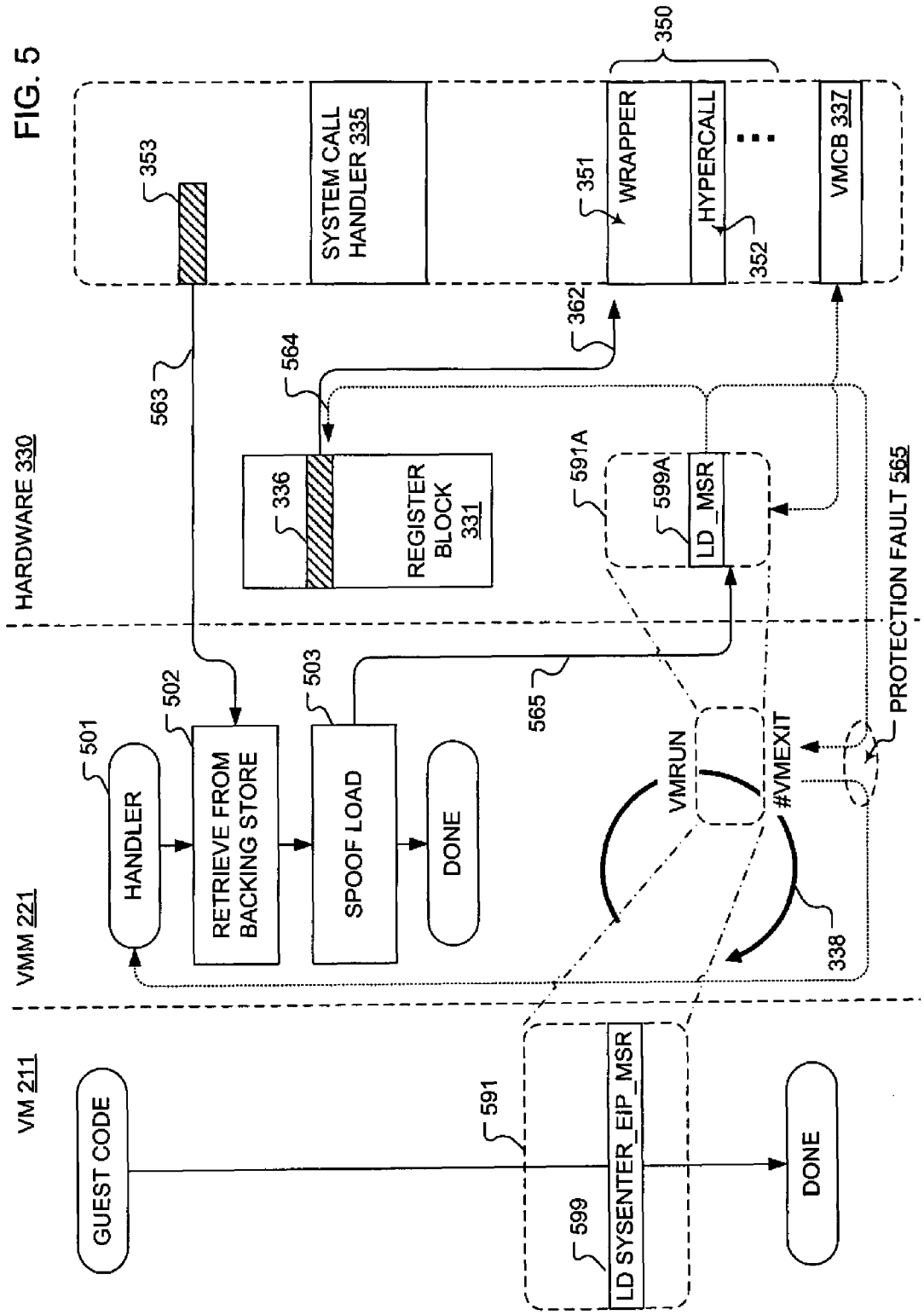
FIG. 5 illustrates operation of a virtualization system that spoofs a guest load from a read-protected, hooked vector in accord with some embodiments of the present invention.
Figure 6:
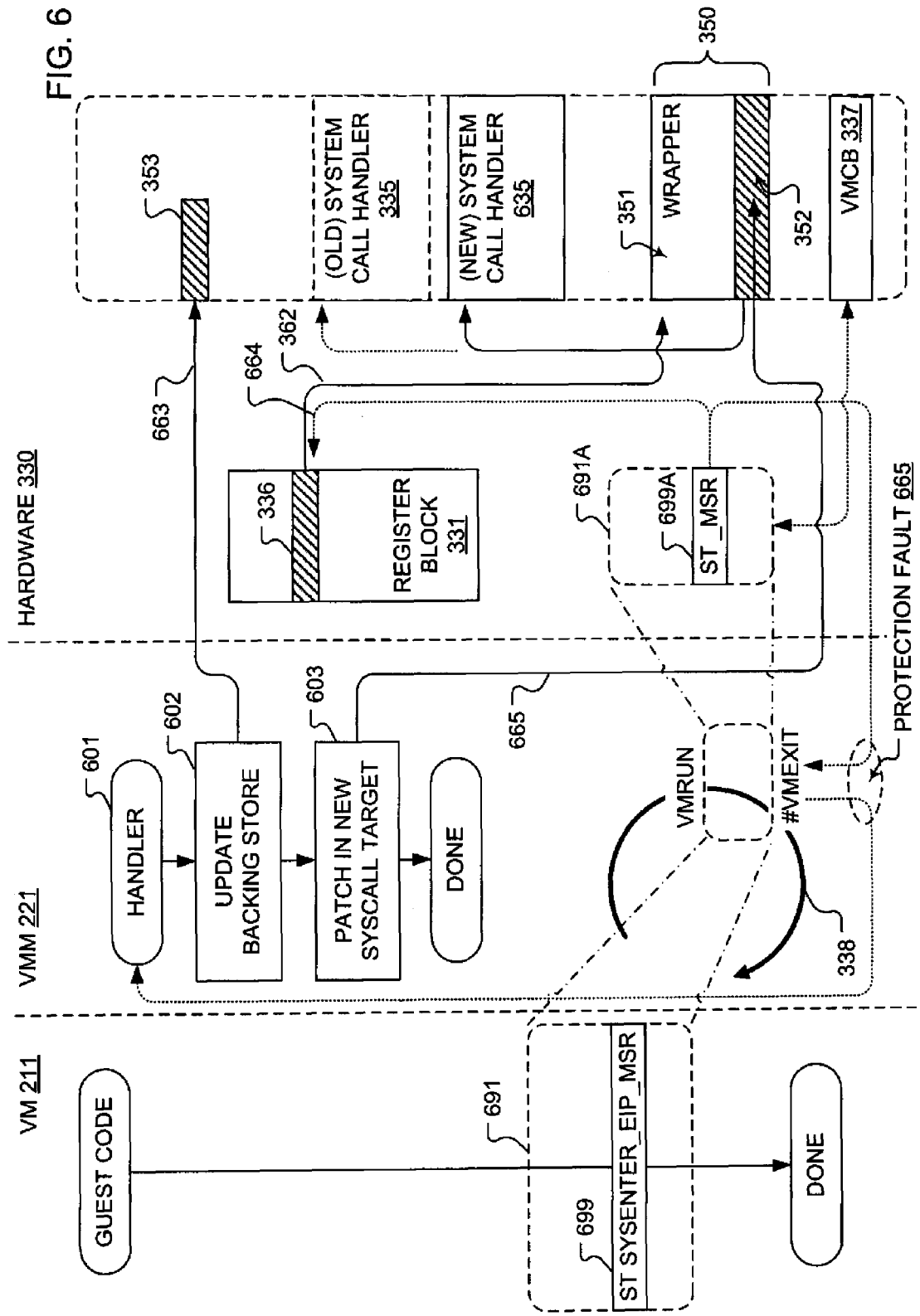
FIG. 6 illustrates operation of a virtualization system that handles a guest write to a write-protected, system call vector storage location that instead contains a hooked vector in accord with some embodiments of the present invention.

In the illustrated configuration, the displaced system call vector(s) are stored in an alternative storage location, illustratively location(s) 353 in memory 332, to support the replay of guest values for relevant locations within supervisor register block 331. As a protection mechanism, such an in-memory backing store can reside in memory not mapped (e.g., in guest or shadow page tables) for guest computations. FIG. 3 illustrates use of backing store 353 to support spoofing (and replay of guest values) and/or to hold updated information. Of course, other stores may be employed in other configurations. FIGS. 5 and 6 illustrate the replay of guest values from a backing store and the update of such a backing store, respectively.

Note that, in the illustrated configuration of FIG. 3, a hook event operation 301 may be initiated based on decision logic of the VMM (see 301A) or based on guest code (e.g., via a hypercall 301B). Likewise, the event hooking mechanism explained with regard to FIG. 3 may be torn down, disabled or suspended based on decision logic of the VMM or similarly from guest code. For example, referring now to FIG. 4, an unhook event operation 401 may be initiated based on decision logic of the VMM (see 401A) or based on guest code (e.g., via a hypercall 401B).

Figure 4:
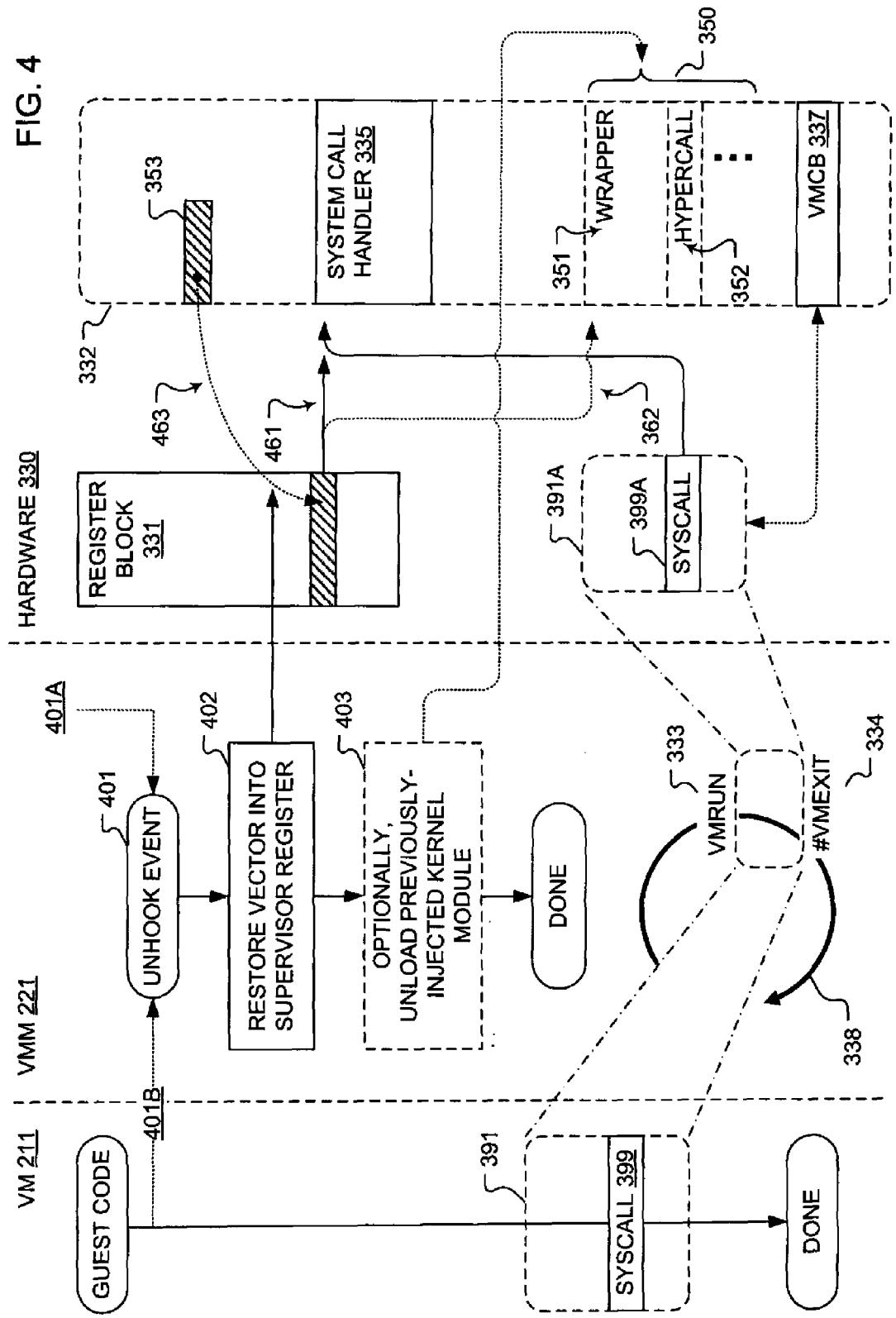
FIG. 4 illustrates operation of a virtualization system that unhooks a previously introduced hooked vector in accord with some embodiments of the present invention.

FIG. 4 illustrates operation of a virtualization system that unhooks a previously introduced hooked vector in accord with some embodiments of the present invention. As before, VMM 221 employs a hardware-assisted direct execution construct 338 whereby direct execution of guest code 391 is initiated on underlying hardware system 330 using a vmrun instruction 333 and, at some later point, control is returned to VMM 221 (see #vmexit 334) based on a set of conditions established for operation of the hardware system when directly executing guest code in, or on behalf of, exported virtual machine 211. As before, building on the hardware-assisted execution model typical of some modern x86 type processor designs, at least some of those conditions are represented in an in-memory data structure (e.g., VMCB 337) that partially defines the execution environment that hardware system 330 presents to guest code 391A FIG. 4 assumes that a "hooked vector" (or vectors) have been previously introduced into supervisor register block 331 (e.g., into a machine specific register, MSR or some other architected, hardware-resident store implemented by hardware system 330) to identify (362) the previously injected alternative handler 350 (recall FIG. 3). Original vector(s) to system call handler 335 is (are) represented in backing store 353 as previously described. Therefore, as previously illustrated and absent the unhook operation now described, when hardware system 330 executes syscall 399A, processor logic thereof would be expected to follow the previously introduced hooked vectors to an entry point 362 for alternative handler 350.

Facilities (e.g., interfaces, code sequences, data structures, etc.) are provided in VMM 221 to initiate an "unhook event" operation 401 by restoring (402) system call vectors 463 from backing store 353 into their conventional locations in supervisor register block 331 thereby displacing the previously introduced hooked vector(s). The restored vector(s) identify the original system call handler 335. As a result, when guest code 391A now encounters syscall 399A (after successful completion of unhook operation 401), the execution sequence vectors to system call handler 335 without executing the previously described pre- and/or post-event instrumentation code (e.g., that implemented by alternative handler 350, wrapper code 351 and hypercall 352). In some embodiments, alternative handler(s) 350 may remain instantiated in memory and instruction pointers thereto may be maintained in suitable location such as 353 for later reintroduction. However, in some embodiments, it may be desirable to unload (403) the previously injected kernel module as illustrated in FIG. 4.

FIG. 5 illustrates operation of a virtualization system that spoofs a guest load from a read-protected, hooked vector in accord with some embodiments of the present invention. Likewise, FIG. 6 illustrates operation of a virtualization system that handles a guest write to a write-protected, system call vector storage location that contains a hooked vector. Accordingly, FIGS. 5 and 6 assume that a "hooked vector" has been previously introduced into system call vector 336 locations of supervisor register block 331 (e.g., into an architecturally specified location in a machine specific register, MSR or some other architected, hardware-resident store implemented by hardware system 330) to identify (362) the previously injected alternative handler 350 (recall FIG. 3). An original vector to system call handler 335 is represented in backing store 353 as previously described. Therefore, as previously illustrated, when hardware system 330 executes a syscall, processor logic thereof would be expected to follow the previously introduced hooked vectors to an entry point 362 for alternative handler 350.

Building on the foregoing, spoofing or replaying guest values for the system call vector may be understood as follows with reference to FIG. 5. As before, VMM 221 employs a hardware-assisted direct execution construct whereby direct execution of guest code (here guest code 591, 591A) is initiated on underlying hardware system 330 using a vmrun instruction and, at some later point, control is returned to VMM 221 (at #vmexit) based on a set of conditions established (e.g., in VMCB 337) for operation of the hardware system when directly executing guest code. In the illustration of FIG. 5, a load instruction (illustratively LD SYSENTER_EIP_MSR 599) targets a read-protected system call vector 336 within supervisor register block 331. The load instruction 599A is included in guest code 591A which is executed in, or on behalf of, exported virtual machine 211 in accord with the previously described hardware-assisted direct execution construct. However, as previously described with reference to FIG. 3, a protection mechanism covers at least a system call vector 336—containing portion of supervisor register block 331. For example in some embodiments, an attempt 564 by the guest computation to access system call vector 336 is handled by VMM 221 based on one or more MSR protection states defined in VMCB 337, whereby the managed execution framework exported by hardware-assisted direct execution construct 338 treats attempt 564 (by guest code 591, 591A) as an event that triggers #VMEXIT.

In accord with the foregoing, FIG. 5 illustrates the #VMEXIT-mediated initiation of handler 501 as protection fault 565 and results in the following. First, the handler retrieves (502) the original vector 563 to system call handler 335 from backing store 353. Then, the handler spoofs contents of system call vector 336 within supervisor register block 331 by replaying (565) the system call vector value expected by the guest into the load target of instruction 599A, e.g., into an appropriate register of the vCPU exported by VMM 221.

Likewise, FIG. 6 illustrates operation of a virtualization system that handles a guest write to a write-protected, system call vector storage location that contains a hooked vector. Accordingly, FIG. 6 assumes that a "hooked vector" has been previously introduced into one or more locations 336 of supervisor register block 331 to identify (362) the previously injected alternative handler 350. An original vector to system call handler 335 is represented in backing store 353 as previously described. Therefore, as previously illustrated, when hardware system 330 executes a syscall, processor logic thereof would be expected to follow the previously introduced hooked vectors to an entry point 362 for alternative handler 350.

Building on the foregoing, FIG. 6 illustrates a method of handling a guest update of its system call vectors (e.g., by guest operating system code executing in VM 211). As before, VMM 221 employs a hardware-assisted direct execution construct whereby direct execution of guest code (here guest code 691, 691A) is initiated on underlying hardware system 330 using a vmrun instruction and, at some later point, control is returned to VMM 221 (at #vmexit) based on a set of conditions in VMCB 337. A store instruction (illustratively ST SYSENTER_EIP_MSR 699) targets a write-protected system call vector 336 within supervisor register block 331. As an example, consider a store instruction that seeks to install a vector to new system call handler 635. To install such a vector, a store instruction 699A is included in guest code 691A which is executed in, or on behalf of, exported virtual machine 211 in accord with the previously described hardware-assisted direct execution construct.

However, as previously described with reference to FIG. 3, a protection mechanism covers at least a system call vector 336—containing portion of supervisor register block 331. Accordingly, an attempt 664 by the guest computation to overwrite system call vector 336 is handled by VMM 221 based on one or more MSR protection states defined in VMCB 337, whereby the managed execution framework exported by hardware-assisted direct execution construct 338 treats attempt 664 (by guest code 691, 691A) as an event that triggers #VMEXIT.

The #VMEXIT-mediated initiation of a handler (here handler 601) is illustrated as protection fault 665 and results in the following. The handler updates (602) the backing store 353, replacing the vector stored therein for existing system call handler 335 with a new value (663) identifying new system call handler 635. Of course, system call vector 336 within supervisor register block 331 continues to vector handling of syscall-type operations to alternative handlers 350. However, updated contents of backing store 353 can support reintroduction as previously described with reference to FIG. 4 and/or replay of guest values as previously described with reference to FIG. 5. In some embodiments of alternative handler 350, hypercall 352 resumes execution of the system call handler (now new system call handler 635) based on then-current contents of backing store 353. Alternatively, in some embodiments, alternative handler 350 may explicitly code an instruction pointer to new system call handler 635. Accordingly, FIG. 6 illustrates a configuration in which handler 601 optionally patches an instruction pointer for new system call handler 635 into alternative handler 350 or into data employed/passed by hypercall 352.

Virtualization System Technology and Variations

Based on the foregoing, persons of ordinary skill in the art will appreciate a variety of strategies by which a virtualization system can selectively interpose on guest system calls using a hooked vector introduced into a supervisor register block and loadable kernel module as alternative handlers, even in systems that cede significant control to hardware by directly executing guest code using hardware-assistance constructs of certain modern processor designs. In addition, in some embodiments, virtual machine control stores or blocks may be adapted for use in establishing protection domains that allow supporting code to be introduced into a guest execution context yet hidden therefrom.

As is well known in art, a virtual machine (VM) is a software abstraction—a "virtualization"—of an actual physical computer system. FIGS. 2-6 illustrate aspects of various virtualization system embodiments in which the virtualization system may selectively interpose on guest system calls that appear within code directly executed using a hardware-assisted execution construct such as popularized in Intel VT-x™ and/or AMD-V™/AMD SVM technology processors. In describing embodiments of the present invention, certain aspects of more complete virtualization system implementations have been abstracted. To facilitate an understanding of the broad applicability of embodiments of the present invention, a few examples of specific virtualization system designs and variations thereon are described.

In general, in most virtualization system designs, some interface is provided between guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Also, because virtualization functionality may also be implemented in hardware, this interface may generally be termed "virtualization logic" to encompass software and/or hardware implementations. Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, embodiments of the present invention may be used (and/or implemented) in (or in conjunction with) virtualized computer systems having any type or configuration of virtualization software.

In view of the above, and without limitation, an interface usually exists between a VM and the underlying platform which is responsible for actually executing VM-issued instructions and transferring data to and from the memory, storage devices and interface devices of underlying hardware. Subject to the foregoing, certain commercially available virtualization systems employ a "virtual machine monitor" (VMM) in this role. A VMM is usually implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1 and 2), in some virtualization system implementations, these "components" are at least partially implemented as constructs or emulations exported to a VM by the VMM. One advantage of such an arrangement is that the VMM may be set up to export "generic" devices, which facilitate VM migration and hardware platform-independence. In general, such functionality may be said to exist in the VM or the VMM.

Figure 7:
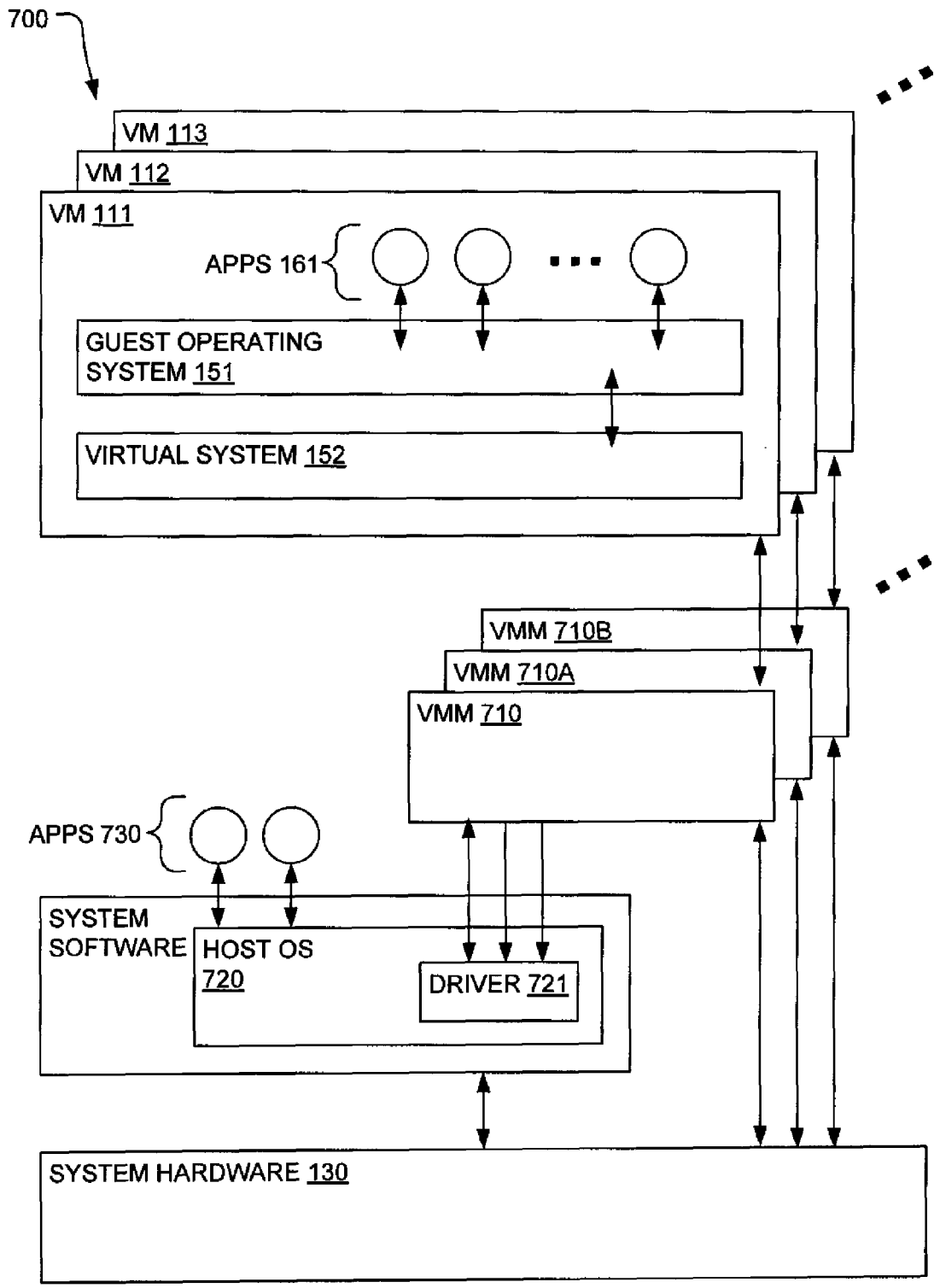
FIGS. 7 and 8 depict functional block diagrams of virtualization system configurations in accordance with respective embodiments of the present invention.
Figure 8:
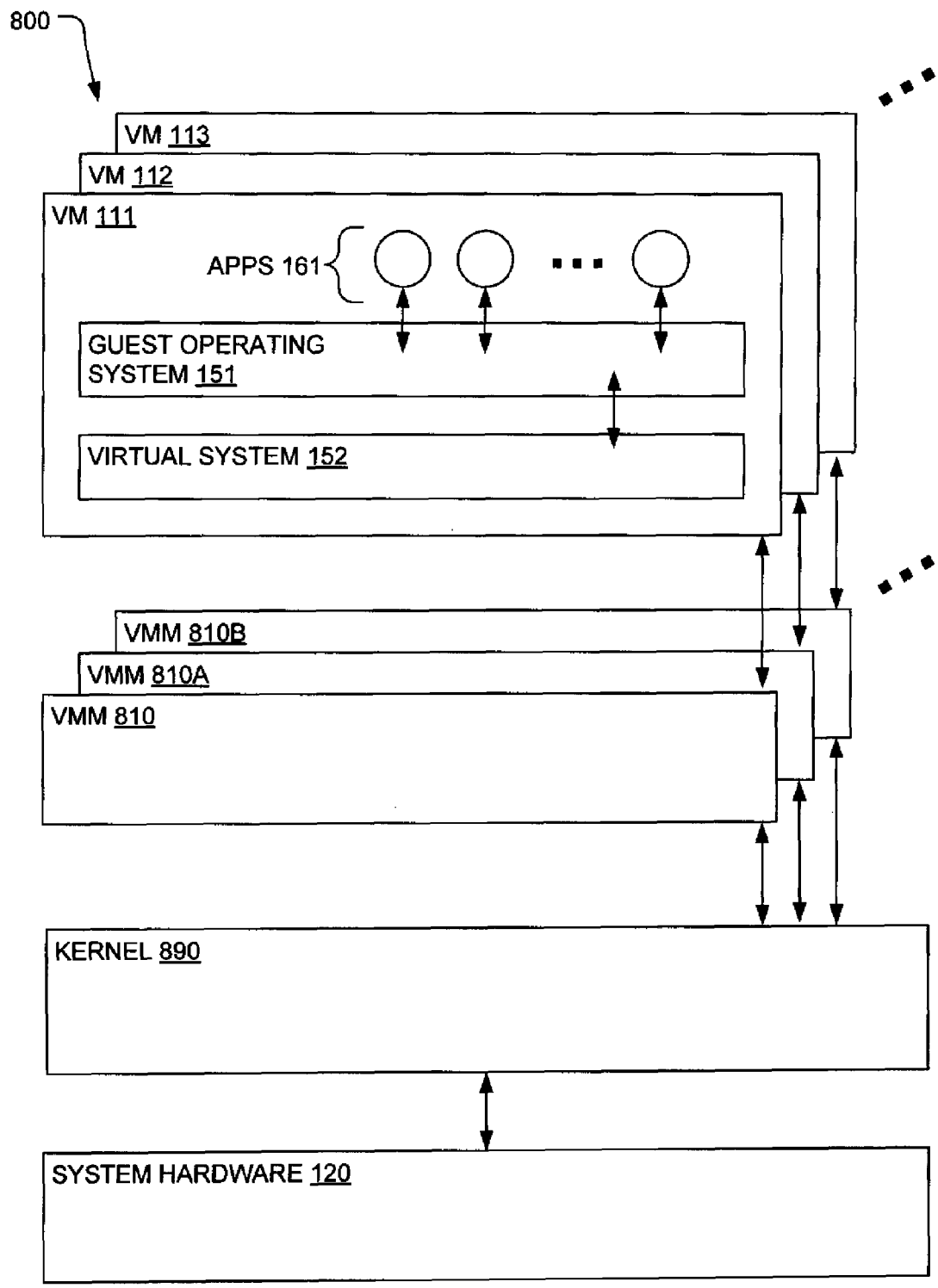

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 7 and 8. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Embodiments of the present invention in which the virtualization system selectively interposes on guest system calls that appear within code directly executed using a hardware-assisted execution construct may build on systems of either configuration. Accordingly, in view of the variations, two exemplary virtualization system configurations are summarized and, based on the preceding description, persons of ordinary skill in the art will appreciate suitable hosted and non-hosted embodiments of the present invention.

Hosted Virtual Computers

FIG. 7 illustrates a virtualization system configuration 700 commonly referred to as a "hosted" virtualized computer system in which a virtual machine monitor (e.g., VMM 710, VMM 710A, VMM 710B) is co-resident at system level with the host operating system 720 such that both the VMMs and the host operating system can independently modify the state of the host processor. VMMs call into the host operating system via driver 721 and a dedicated one of the user-level applications 730 to have the host OS perform certain I/O operations on behalf of the VM. The virtual computer in this configuration is thus hosted in that it runs in coordination with an existing host operating system. Virtualization systems that include suitable facilities are available in the marketplace. For example, VMware® Server virtual infrastructure software available from VMware, Inc., Palo Alto, Calif. implements a hosted virtualization system configuration consistent with the illustration of FIG. 7. VMware® Workstation desktop virtualization software, also available from VMware, Inc. also implements a hosted virtualization system configuration consistent with the illustration of FIG. 7.

Non-Hosted Virtual Computers

FIG. 8 illustrates a virtualization system configuration commonly referred to as a "non-hosted" virtualized computer system in which a dedicated kernel 890 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. For example, VMware ESX™ and ESX Server virtual infrastructure software available from VMware, Inc., Palo Alto, Calif. implements a non-hosted virtualization system configuration consistent with the illustration of FIG. 8. ESX is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term which has yet to achieve a universally accepted definition is that of "para-virtualization." As the name implies, a "para-virtualized" system is not "fully" virtualized, but rather the guest is configured in some way to provide certain features that facilitate virtualization.

For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization. Furthermore, embodiments of techniques described herein for interdicting system calls can also be applied to "hypercalls" between a guest and a VMM or hypervisor. In general, hypercall mechanisms are part of a well-defined interface for transitioning between the guest and the VMM/hypervisor, while system call mechanisms are part of a well-defined interface for transitioning between user-mode and kernel-mode. Accordingly, based on the description herein, persons of ordinary skill in the art will appreciate analogous, hypercall-targeted adaptations of the aforementioned techniques for interdicting system calls.

Other Embodiments

While the invention(s) is (are) described with reference to various implementations and embodiments, it will be understood that these embodiments are illustrative and that the scope of the invention(s) is not limited to them. In general, virtual machines may be implemented consistent with hardware systems now existing or hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system techniques for interposing alternative handlers may be incorporated in so-called "para-virtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while strategies for selectively interposing on syscall-type operations have been described in detail herein, other techniques and strategies will also be appreciated by persons of ordinary skill in the art based on the description herein. Furthermore, while techniques and mechanisms have been described using particular hardware-assist features, processor architectures, memory organizations and particular operating system constructs (typically IA-32 based architectures/systems and Windows or Linux-based operating systems) as a descriptive framework, persons of ordinary skill in the art will recognize that it is straightforward to modify such implementations for use in systems that support other hardware-assist constructs, processor instruction set architectures, other network or memory configurations and/or other operating system constructs. Furthermore, although certain embodiments of the present invention are illustrated herein in a descriptive context that includes software distributed conventionally (and often in multiple separately packaged components) as operating system and/or application software that are together executable as a guest computation, other guest software models are also possible. For example, guest software instances may be implemented as "so-called" virtual appliances in the form of pre-built, pre-configured, ready-to-run applications typically packaged with an operating system inside a virtual machine as a self-contained, self-consistent, software solution.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of interposing operations in a computational system that includes a virtualization system executable on an underlying hardware processor that natively supports one or more instructions that transition between host and guest execution modes, the method comprising:

introducing a hooked vector into a supervisor register block of the hardware processor, wherein the hooked vector displaces a system call handler vector otherwise set by a guest computation to activate a system call handler;

read and write protecting at least the hooked vector containing portion of the supervisor register block by executing a protection mechanism that covers a system call vector containing portion of the supervisor register block, the protection mechanism hiding the hooked vector from the guest computation;

initiating execution of a code sequence of the guest computation on the hardware processor using one of the instructions that transition between the host and guest execution modes thereof, wherein the code sequence includes a system call and wherein upon initiation of the system call, the hardware processor transfers execution to a substitute handler in accordance with the hooked vector, the substitute handler being introduced into the guest computation as a loadable kernel module; and responsive to execution of the substitute handler, initiating a hooked operation and transferring control to the system call handler.

2. The method of claim 1, further comprising:
after initiating a hooked operation and transferring control to the system call handler, restoring the system call handler vector in the supervisor register block; and
thereafter, reintroducing the hooked vector, wherein the restoring and reintroducing are performed dynamically in response to respective hypercalls.

3. The method of claim 1, wherein the supervisor register block includes at least a particular one of:
a model-specific register;
a control register;
a virtual machine control block (VMCB); and
a virtual machine control store (VMCS),
in which the hardware processor ordinarily encodes the system call handler vector.

4. The method of claim 1, wherein the initiation of the hooked operation and control transfer to the system call handler are performed integrally and non-interruptably.

5. The method of claim 1, wherein the hooked operation includes execution of either or both of pre- and post-system-call code.

6. The method of claim 1, further comprising:
executing the hooked operation within an execution context of the guest computation.

7. The method of claim 1, further comprising:
performing a hypercall from an execution context of the guest computation and executing the hooked operation within an execution context of the virtualization system.

8. The method of claim 1, wherein the supervisor register block include a control register, wherein the control register includes a model-specific register (MSR) of the hardware processor.

9. The method of claim 1, wherein the hooked operation instruments a subset of system call events relative to one of more of:
performance monitoring;
execution correctness or auditing;
a security behavior; and
policy enforcement.

10. The method of claim 9, further comprising:
selecting the instrumented subset of system call events in response to a hypercall.

11. A computational system comprising:
a hardware processor; and
a virtualization system that coordinates an execution on the hardware processor that provides hardware-assistance for virtualization using a native instruction executable on the hardware processor to initiate a guest execution mode for direct execution of code associated with a guest computation, the virtualization system configured to selectively interpose on system calls initiated by the guest computation using:
a hooked vector introduced into a supervisor register block of the processor, displacing a system call handler vector otherwise set by the guest computation to activate a system call handler;
a protection mechanism that covers the system call handler vector containing portion of the supervisor register block, the protection mechanism hiding the hooked vector from the guest computation, and wherein at least the hooked vector containing portion of the supervisor register block is read and write protected, and
a substitute handler introduced into the guest computation code as a loadable kernel module, the substitute handler executable to initiate a hooked operation and to transfer control to the system call handler, wherein the virtualization system spoofs operative content of a system call handler vector coding of the supervisor register block which includes a model-specific register based on protection faults serviced by the virtualization system.

12. The virtualization system of claim 11, embodied as software encoded in one or more non-transitory computer readable media and executable on an underlying physical machine that includes the hardware processor and the supervisor register block.

13. The virtualization system of claim 11, operatively combined with a physical machine that includes the hardware processor and the supervisor register block.

14. The virtualization system of claim 11, embodied as software instantiated in memory of a physical machine that includes the hardware processor and the supervisor register block, the instantiated software executable on one or more processors of the physical machine.

15. A computer program product embodied in one or more non-transitory computer readable media comprising computer-executable instructions that when executed by one or more processors, causes the one or more processors to:
introduce a hooked vector into a supervisor register block of a hardware processor, wherein the hooked vector displaces a system call handler vector otherwise set by a guest computation to activate a system call handler;
read and write protect at least a hooked vector containing portion of the supervisor register block by executing a protection mechanism that covers a system call vector containing portion of the supervisor register block, the protection mechanism hiding the hooked vector from the guest computation;
initiate execution of a code sequence of the guest computation on the hardware processor using an instruction that transitions between the host and guest execution modes thereof, wherein the code sequence includes a system call and wherein upon initiation of the system call, the hardware processor transfers execution to a substitute handler in accordance with the hooked vector, the substitute handler being introduced into the guest computation as a loadable kernel module; and
responsive to execution of the substitute handler, initiate a hooked operation and transferring control to the system call handler.

16. The computer program product of claim 15, wherein the computer-executable instructions further causes the one or processors to introduce at least one hypercall that transfers control from an execution context of the guest computation to the virtualization system.

17. The computer program product of claim 15, wherein the hooked operation instruments a subset of system call events relative to one or more of performance monitoring, execution correctness or auditing, a security behavior, and policy enforcement.

18. The computer program product of claim 17, wherein the computer-executable instructions further causes the one or processors to implement a hypercall interface whereby the guest computation may select the instrumented subset of system call events.

19. The computer program product of claim 15, wherein the non-transitory computer readable media are selected from the set of a disk, tape or other magnetic, optical or electronic storage medium.

20. The method of claim 1, wherein hiding the hooked vector from the guest computation comprises read protecting appropriate portions of the supervisor register block and replaying guest values using a handled protection fault.

* * * * *